United States Patent [19]
Stefani

[11] Patent Number: 5,736,089
[45] Date of Patent: Apr. 7, 1998

[54] METHOD FOR PRODUCING ROLLERS COVERED WITH LAYERS OF SILICONE-BASED MATERIAL

[75] Inventor: Franco Stefani, Sassuolo, Italy

[73] Assignee: Syfal S.R.L., Sassuolo, Italy

[21] Appl. No.: 396,387

[22] Filed: Feb. 28, 1995

[30] Foreign Application Priority Data

Mar. 8, 1994 [IT] Italy ................... MO94A0032
Mar. 8, 1994 [IT] Italy ................... MO940010 U

[51] Int. Cl.⁶ .................. B29C 39/08; B29C 39/10; B29C 39/12
[52] U.S. Cl. ................. 264/255; 264/273; 264/311
[58] Field of Search .................... 264/255, 311, 264/312, 273, 310

[56] References Cited

U.S. PATENT DOCUMENTS

| | | | |
|---|---|---|---|
| 2,541,531 | 2/1951 | Morris et al. | 265/255 X |
| 3,529,054 | 9/1970 | Hepner | 264/311 X |
| 3,539,671 | 11/1970 | Nauta | 264/265 X |
| 3,561,059 | 2/1971 | Guldenfels . | |
| 3,607,494 | 9/1971 | Rowland | 264/269 X |
| 3,634,578 | 1/1972 | Suzuki | 264/312 X |
| 3,700,764 | 10/1972 | Tago | 264/273 |
| 3,737,963 | 6/1973 | Thermann et al. . | |
| 3,816,582 | 6/1974 | Tennyson | 264/255 |
| 3,956,448 | 5/1976 | Larson | 264/311 X |
| 3,997,645 | 12/1976 | Dempster | 264/311 X |
| 4,098,631 | 7/1978 | Stryjewski | 264/266 X |
| 4,113,825 | 9/1978 | Hill et al. | 264/266 X |
| 4,373,933 | 2/1983 | Grazen | 264/311 X |
| 4,548,779 | 10/1985 | Steinberg et al. | 264/311 X |
| 5,008,045 | 4/1991 | Manchak, Jr. et al. | 264/311 X |
| 5,089,201 | 2/1992 | Takahashi | 264/265 X |
| 5,110,382 | 5/1992 | Terry et al. | 264/273 X |

FOREIGN PATENT DOCUMENTS

| | | | |
|---|---|---|---|
| 1 490 089 | 11/1967 | France . | |
| 2 000 694 | 7/1970 | Germany . | |
| 2003689 | 8/1970 | Germany | 264/273 |
| 2 637 683 | 2/1978 | Germany . | |
| 5016267 | 1/1993 | Japan | 264/312 |
| 749 541 | 5/1956 | United Kingdom . | |

Primary Examiner—Karen Aftergut

[57] ABSTRACT

The supporting structure coverable with a plurality of concentric layers of elastic silicone-based material to produce rollers having a mirror-finished flexible outer surface has a hollow cylindrical body and a surface that is affected by a plurality of openings which are variously distributed and sized to allow the passage, produced by centrifugal force, of the material in the fluid/semifluid state from the inside towards the outer surface and to provide subsequent engagement.

17 Claims, 3 Drawing Sheets

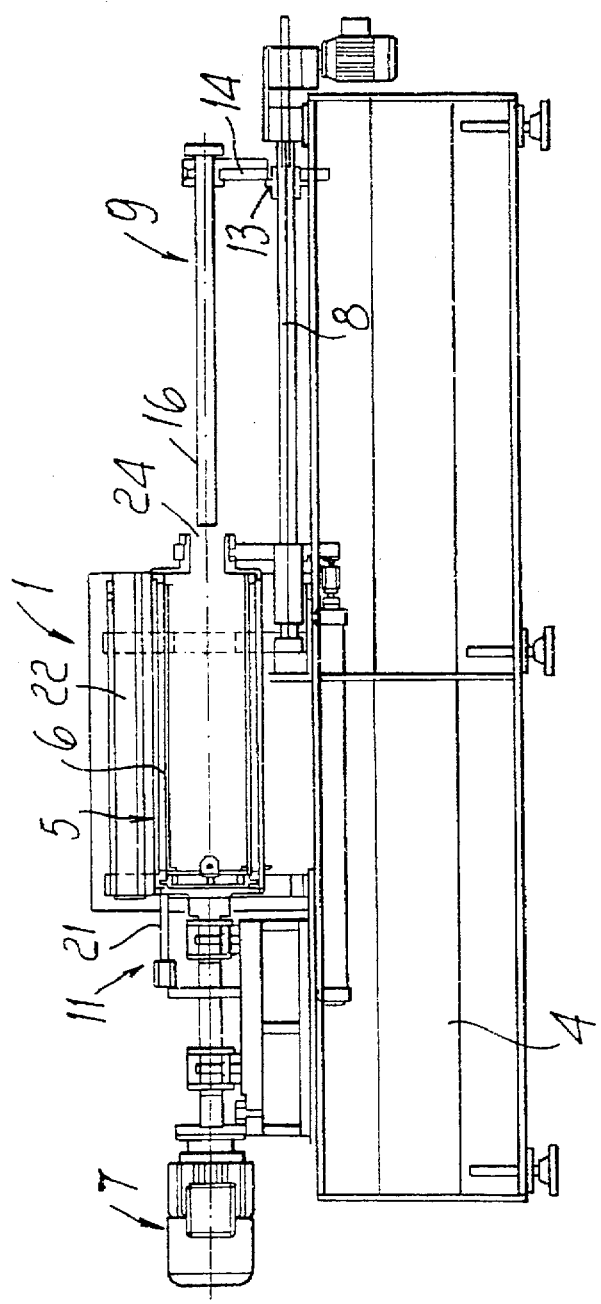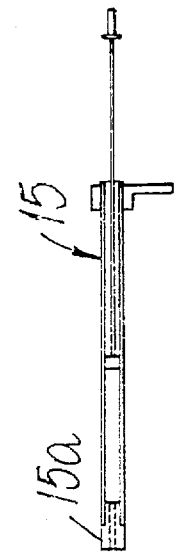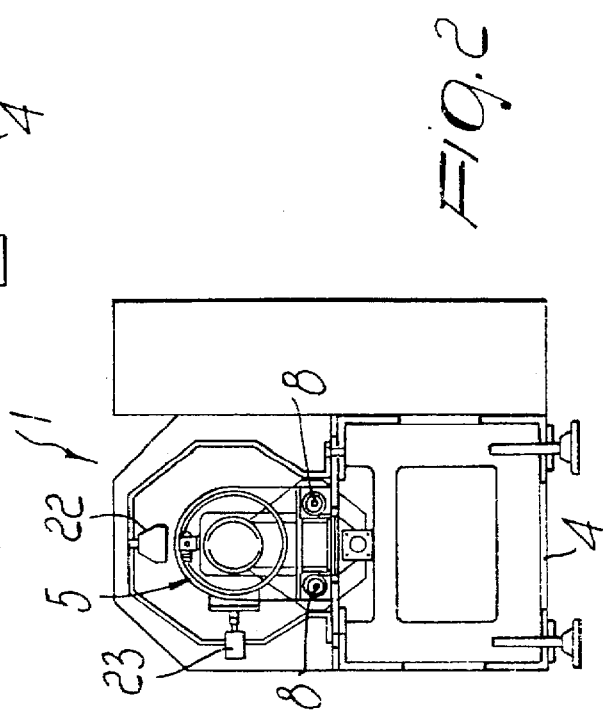

METHOD FOR PRODUCING ROLLERS COVERED WITH LAYERS OF SILICONE-BASED MATERIAL

BACKGROUND OF THE INVENTION

The present invention relates to a method for producing rollers covered with layers of elastic silicone-based material and to a machine and a supporting structure for carrying out the method.

Rollers made of silicone-based material have long been produced and used in printing by providing a matrix on their perimetric surface and by using the elasticity of their material to compensate for any microscopic bumps of the surfaces to which the print is to be applied.

Several other fields have long used rollers of various sizes which must have in common the characteristic of having an outer surface that is absolutely free from imperfections and is somewhat flexible to spontaneously adapt to the complementary surfaces with which they make contact; this is the case, for example, of rollers used as matrixes to decorate flat surfaces of products such as ceramic tiles.

Another field in which this type of roller is normally used is transport and conveyance in machines equipped with precision mechanics, such as photocopiers.

The above-mentioned decoration technique and precision in transport both require that the outer surfaces of the rollers on which the pattern to be printed is formed or on which the transported sheets rest, are smooth or indeed mirror-finished, so as to avoid any smudge or imperfection.

Accordingly, these rollers must have the smoothest possible lateral surface, with absolutely no imperfections and even mirror-finished and, as mentioned, substantially soft.

Said rollers are currently manufactured according to two basic methods: a first one consists in applying to a solid supporting cylinder strips of silicone rubber which are subsequently vulcanized; the surface thus obtained is then ground. A second process consists in pouring liquid degassed silicone into an openable cylindrical mold in which a support is placed; this is followed by a step for grinding the manufactured product.

However, both of the above described processes have drawbacks; in the first case it is impossible to obtain a surface that is sufficiently smooth, and mirror-finished; in addition said process requires onerous manual grinding operations during which the flexibility of the surface cannot drop below a certain value.

In the second case, only a single-layer covering can be obtained, and grinding is still necessary to eliminate the burr that forms in the points where the mold parts join.

Hence in both cases it is necessary to follow the actual covering step with the grinding step, and this entails a considerable waste of time and labor that negatively affects the production costs of the finished product.

Furthermore, the level of perfection that can be achieved with said grinding is still inadequate for the particular intended use of said rollers.

SUMMARY OF THE INVENTION

The aim of the present invention is to provide a method for producing rollers covered with layers of elastic silicone-based material as well as a machine and a supporting structure for carrying out the method, which allow to obtain, in a fully automatic manner and without requiring grinding, printing rollers which have mirror-finished external surfaces in addition to a covering formed by multiple concentric layers that can be flexible according to the requirements.

This aim and other objects are all achieved by a method for producing rollers covered with layers of elastic silicone-based material, characterized in that it comprises:

— a first step, in which a prepared cylindrical supporting structure whose outer surface is perforated and can be covered, is positioned on a machine that rotates at variable speeds;

— a second step, in which elastic silicone-based material in the fluid/semifluid state is introduced inside said supporting structure, which is made to rotate about its own axis;

— a third step, in which said supporting structure is activated so as to rotate rapidly, causing the material to pass, by centrifugal force, from the inside of said supporting structure to the outside through the holes, forming a single- or multilayer covering with said material of the outer surface of the supporting structure;

— a fourth step, in which the obtained covering is cured/polymerized by heating at a low rotation rate of the supporting structure; and — a fifth step, in which the covered cylinder is removed from said machine; said second, third, and fourth steps being repeatable in a cyclic manner to provide multiple layers of materials on a single supporting structure.

Advantageously, the machine for carrying out the method is characterized in that it comprises a base frame on which a box-like cylindrical mold/support is mounted; a prepared coverable cylindrical supporting structure can be inserted hermetically and coaxially in said mold, which is provided with means for rotating said supporting structure about its own longitudinal axis; slides are mounted on said base frame and on one side of said mold and allow the guided sliding of means for introducing elastic silicone-based material inside the supporting structure; elements for removing each covered roller from the mold are mounted on the opposite side; and means for heating/polymerizing the covering of a finished roller are provided at said mold.

Conveniently, the supporting structure for applying the method is characterized in that it comprises a cylindrical body whose surface is perforated by a plurality of through holes to allow the passage, produced by centrifugal force, of the elastic silicone-based material introduced in the internal cavity onto the outer perimetric surface and to provide engagement therewith; and respective flanges, whose perimeters form a series of parallel grooves, can be mounted at the ends of said cylindrical body.

BRIEF DESCRIPTION OF THE DRAWINGS

Further characteristics and advantages of the invention will become apparent from the description of a preferred but not exclusive embodiment of a method for producing rollers covered with layers of elastic silicone-based material and of a machine and a supporting structure for applying the method, illustrated only by way of non-limitative example in the accompanying drawings, wherein:

FIG. 1 is a front view of a machine for producing rollers covered with layers of elastic silicone-based material;

FIG. 2 is a side view thereof;

FIG. 3 is a detail view of means for introducing elastic silicone-based material;

DESCRIPTION OF THE PREFERRED EMBODIMENTS

Figure 4:
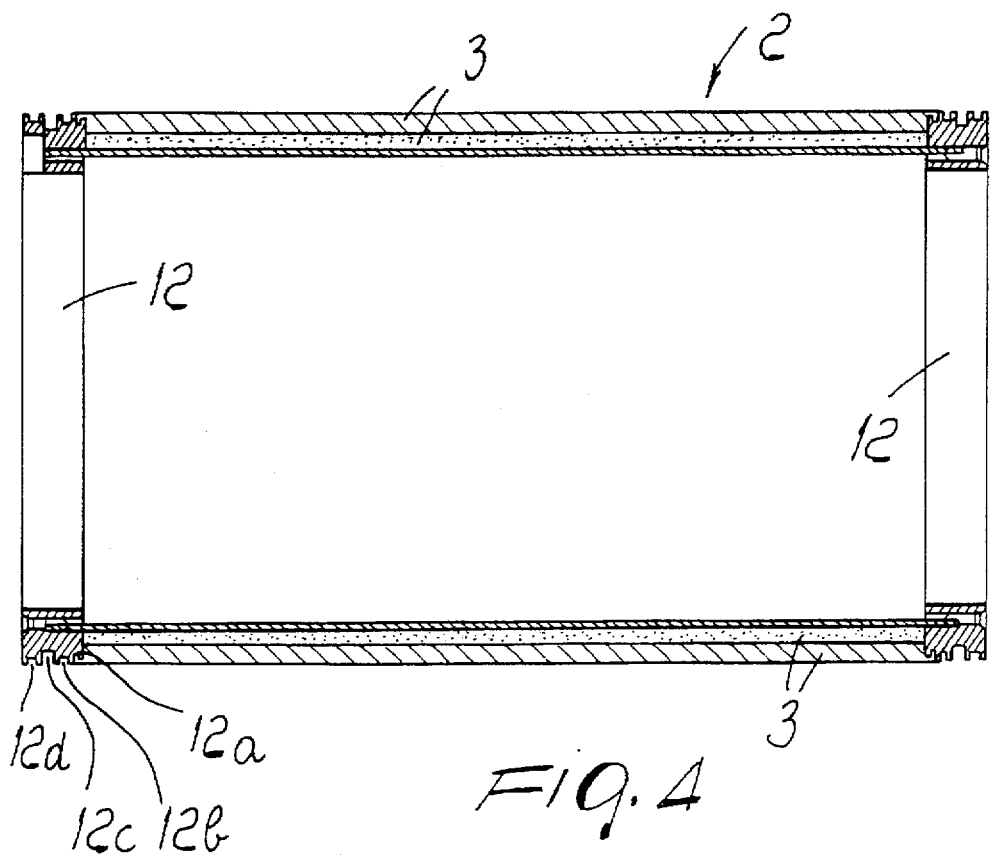
FIG. 4 is an enlarged-scale longitudinal sectional view of a roller obtained with said machine.
Figure 5:
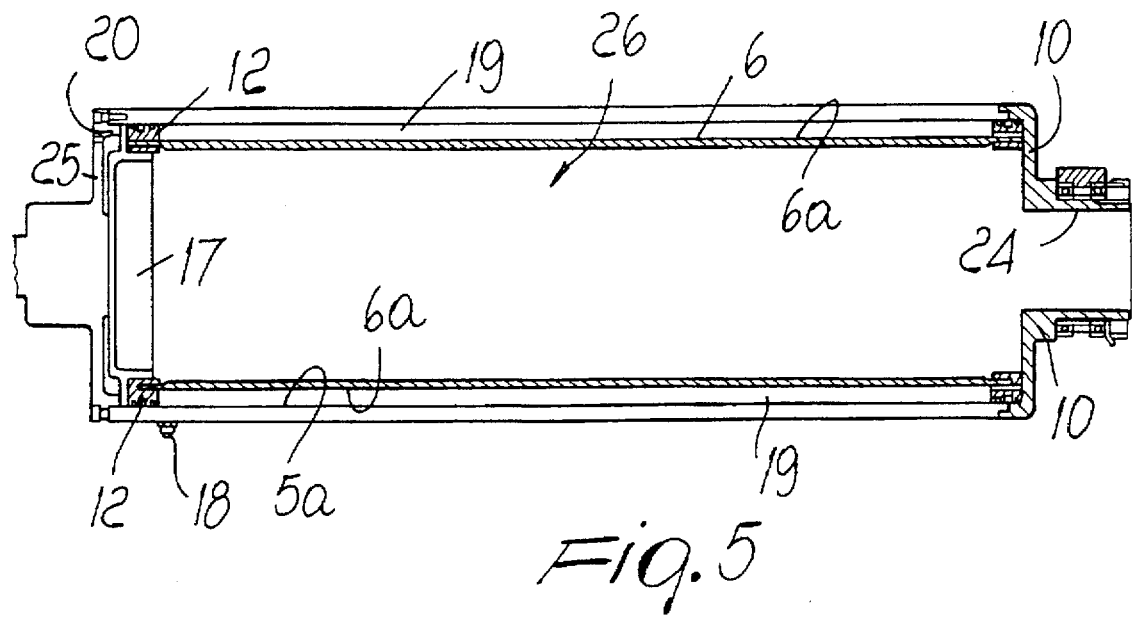
FIG. 5 is another longitudinal sectional view of a mold (or box-like support) inside which a supporting structure prepared to receive the covering is placed.

With reference to the above figures, the reference numeral 1 generally designates a machine for producing rollers 2 with a cylindrical body covered with layers 3 of elastic silicone-based material; the machine comprises a base frame 4 on which a mold, or support, 5 is mounted; the mold has a box-like cylindrical body, and a prepared cylindrical supporting structure 6 coverable with elastic material which can be placed axially and snugly in said mold so as to provide a perimetric seal.

The mold 5 has means 7 which are adapted to make it rotate about its own longitudinal axis, and slides 8 are mounted respectively and bilaterally on its sides, and are supported by said base frame 4; said slides 8 guide the sliding of means 9 for introducing elastic silicone-based material inside an internal cavity 26 of the supporting structure 6 through an adapted opening 24 which is formed in a side of said structure 6 which is closed with a corresponding endplate 10; elements 11 for removing each covered roller 2 from the mold 5 are mounted on the opposite side.

The mold 5 is provided with conventional means for heating the covering of a finished roller 2 by irradiation.

Each supporting structure 6, prior to its insertion in the mold 5, is prepared: in practice, respective flanges 12 are applied in a conventional manner to the ends of the perforated and coverable cylindrical body; each flange 12 has, on its outer surface, a series of adjacent grooves which, if viewed from the inside towards the outside of the supporting structure, are in sequence: the groove 12a for engagement of the layer of elastic silicone-based material; the groove 12b for accommodating a first annular sealing gasket and for collecting printing ink during the use of the roller 2; the groove 12c for collecting the printing ink during use of the roller; and the groove 12d for accommodating a second annular sealing gasket and for collecting the printing ink; at least one reference notch, not shown in the drawings, is furthermore provided on each flange 12 to provide correct positioning.

Said means 9 for introducing elastic silicone-based material inside the supporting structures 6 are constituted by a carriage 13 which is movable back and forth along said slides 8 and on which carriage it is possible to mount alternately, along a horizontal axis that lies coaxially to the supporting structure 6 and after interposing a supporting and retention bracket 14, either a syringe 15 which is pre-loaded with said elastic silicone-based material or, when the filling material is depleted, a tubular element 16, one end thereof can be connected to a conventional machine for producing elastic foamed material (not shown); the opposite end can be inserted in each supporting structure 6 mounted on the mold 5 by moving said carriage 13.

The elements 11 for removing a covered roller 2 are constituted by a bottom 17 which is mounted hermetically, before insertion in the mold 5, at the end of a prepared supporting structure 6 on the side that lies opposite to the one from which material is introduced in the supporting structure, and by a valve element 18 of the one-way type which is mounted on said mold 5 and is adapted to connect to the outside the interspace 19 that remains between the internal surface 5a of said mold and the outer surface of the peripheral wall 6a of a supporting structure 6 which is arranged therein; the elements 11 also include a port 20 through which it is possible to insert a nozzle 21 for injecting a pressurized fluid; said port 20 is formed in the head wall 25 of the mold 5.

Figure 6:
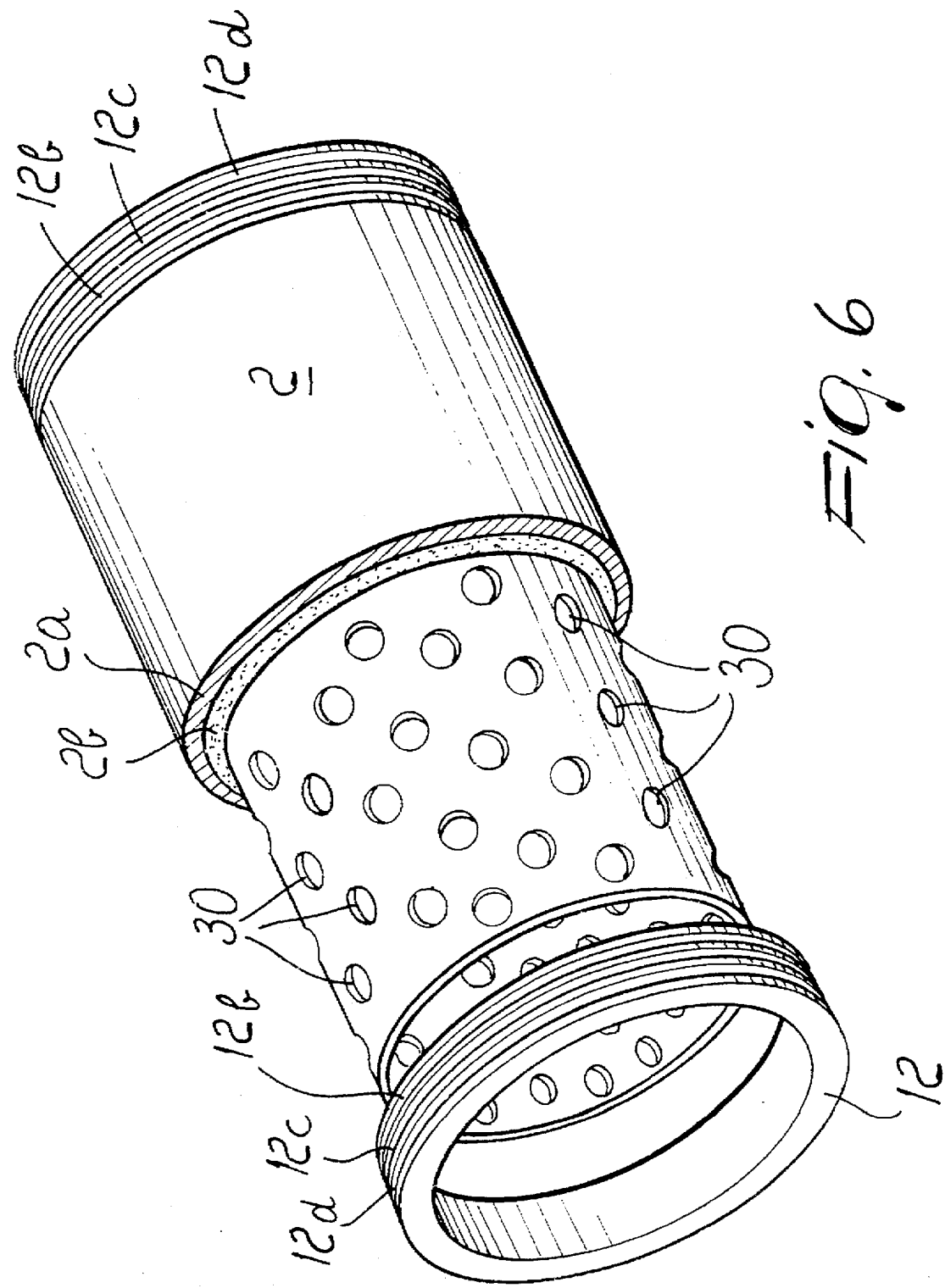
FIG. 6 is a perspective view of a roller, according to the invention and shown, for clarity, covered only partially by layers of elastic silicone-based material.

With reference to FIG. 6, the reference numeral 2 generally designates a supporting structure which can be covered with multiple layers 3 of material, usually constituted by silicone in the outside layer 2a and by foams of the same material in the inside layer 2b; the cylindrical supporting body 6 of said supporting structure is affected by multiple through openings 30 and is internally hollow.

If the finished roller is used for printing, respective flanges 12 as said can be applied to the ends of said cylindrical body 6 in a conventional manner, for example with screws; the perimetric surfaces of said flanges are crossed by a series of only three parallel grooves 12b, 12c, and 12d in which the outer grooves 12d are adapted to snugly temporarily accommodate respective annular gaskets which are not shown in the drawings as they are of a conventional type, the adjacent grooves 12c act as channel for collecting the excess ink during use of the finished roller for printing patterns, and the grooves 12b form a collar for grip on the covering 3. When said covering is completed on the body 2, said annular gaskets are removed and the grooves 12d and 12c also act as ink collectors.

The method for producing rollers covered with layers of elastic silicone-based material and the operation of the machine for carrying out the method are as follows: each supporting structure 6 is prepared by applying the two flanges 12 to the ends of the cylindrical body of said supporting structure, which is affected by a plurality of holes 30, and by mounting the corresponding annular gaskets (O-rings) in the appropriate grooves, respectively 12b and 12d, of said flanges; then one of the ends of the supporting structure 6 is closed by applying the bottom 17 thereto, and the entire assembly is inserted in the mold 5 by means of the thrust of the endplate 10, completing the first step of the method for positioning the prepared supporting structure.

Then the syringe 15 is loaded with the elastic silicone-based material, and a dispenser plug 15a, crossed centrally by a passage channel, is applied to the outlet of said syringe; said syringe is fixed to the carriage 13 by means of the bracket 14 and then inserted in the supporting structure 6, which has been set turning at a rate that is appropriate for the type of material to be injected.

The plunger of the syringe 15 is locked in position in a conventional manner, and a command sent by a computer that controls the entire operation of the machine causes the carriage 13 to retract, expelling the material from the syringe; said material is distributed along a helical path inside the supporting structure 6, and the second step of the method is thus completed.

The empty syringe is removed from the bracket 14 and the tubular element 16 is mounted in its place.

At the same time, in a third step, the mold 5 is made to rotate very rapidly, and due to the centrifugal force, the elastic silicone-based material passes through the holes 30 of the peripheral wall surface 6a of the supporting structure 6 and distributes over the outer surface of said supporting structure, creating a uniform layer without air bubbles. The fourth step is completed by reducing the rotation rate of the mold 5 and by activating the set of resistors 22, polymerizing the layer of material thus formed on the surface of the supporting structure 6.

By using the same technique used for forming the first layer 2a, the tubular element 16, which is connectable to a conventional machine that produces a foam of elastic silicone-based material more elastic than the previous composition, forms the additional underlayers 2b from the inside of the supporting structure 6; said underlayers 2b are therefor more yielding and elastic as they are constituted by foams and thus by materials with a high percentage of empty space, as expressly required for the use of the finished rollers 2.

When the various layers made of elastic silicone-based material or constituted by foams have been completed, the fifth step is performed; in this step, the finished roller 2 is removed from the mold 5 inside which it is firmly seated due to the adhesion between the contiguous walls, which are in mutual contact.

A liquid is forced, for example by means of a pneumatic cylinder 23, through the one-way valve element 18 in order to separate said walls; said liquid is arranged in a thin layer between said walls and fully separates them when the mold 5 is rotated at high speed for a given time.

An additional injector nozzle 21 injects pressurized air inside the mold 5 through the port 20, acting on the bottom 17 and pushing the finished roller 2 towards the outside of said mold; said roller is thus ready to be etched and used for printing, since its outer surface is smooth to the point of being mirror-finished and has a certain elastic rigidity and a substantially resilient substrate, also in an elastic manner in order to absorb, during use, any non-uniformities of the complementary surfaces with which it makes contact.

More than one outer layer and inner layer may be provided, according to the requirements, simply by repeating the steps for distribution and for rotating the supporting structure.

In practice it has been observed that the described invention achieves the intended aim and objects.

The invention thus conceived is susceptible of modifications and variations, all of which are within the scope of the inventive concept.

All the details may furthermore be replaced with other technically equivalent elements.

In the practical embodiment of the invention, the materials used, as well as the shapes and dimensions, may be any according to the requirements without thereby abandoning the protective scope of the claims that follow.

What is claimed is:

1. Method for producing rollers covered with layers of elastic silicone-based material, comprising:
    a first step, in which a prepared cylindrical supporting structure defining an internal cavity is positioned on a machine that rotates at variable speeds, said structure having a perforated peripheral outer surface, said surface being coverable with elastic material;
    a second step, in which elastic silicone-based material ranging from fluid to semifluid state is introduced in said internal cavity of said supporting structure, and said supporting structure being further rotated about its own axis;
    a third step, in which said supporting structure activated so as to rotate rapidly, causing said material to pass, by centrifugal force, from said internal cavity to said outer surface thereof through said perforated peripheral outer surface for forming at least one layer covering with said material, said covering wrapping said outer surface of said supporting structure;
    a fourth step, in which said supporting structure is rotated at a low rate and said obtained covering is cured by heating; and
    a fifth step, in which said covered supporting structure is removed from said machine; wherein said second, third, and fourth steps are repeated in a cyclic manner to provide a plurality of layers of materials on a single supporting structure.

2. Method for producing rollers covered with layers of elastic silicone-based material according to claim 1, wherein said perforated outer surface of said structure is coverable by elastic material, respective flanges being applied to ends of said cylindrical structure prior to said first step for positioning said structure on said machine, each flange having, on its outer surface, a plurality of mutually adjacent grooves, said grooves being adapted respectively for gripping a layer of elastic silicone-based material, for accommodating a first annular sealing gasket, for collecting printing ink during use of said roller, and for accommodating a second annular sealing gasket, at least one reference notch for said positioning being also provided.

3. A method for producing a roller having at least one layer of elastic silicone-based material, comprising the steps of:
    arranging a substantially cylindrical perforated hollow roller supporting structure inside a substantially cylindrical hollow support mold so as to define an interspace between an inner surface of said support mold and an outer surface of said roller supporting structure;
    inserting an elastic silicone-based material inside said roller supporting structure; and
    rotating said roller supporting structure such that said elastic silicone-based material flows from an inside of said roller supporting structure and through said perforated hollow roller supporting structure into said interspace to form a roller having at least one layer of elastic silicone-based material on said outer surface of said substantially cylindrical perforated hollow roller supporting structure;
    wherein said step of inserting said elastic silicone-based material inside said roller is performed while said roller supporting structure is rotated; and
    wherein said method further includes performing first steps of inserting a first elastic silicone-based material inside said roller supporting structure and rotating said roller supporting structure such that said first elastic silicone-based material flows from said inside of said roller supporting structure into said interspace, and performing second steps of inserting a second elastic silicone-based material inside said roller supporting structure and rotating said roller supporting structure such that said second elastic silicone-based material flows from said inside of said roller supporting structure into said interspace, in a manner such as to form a first layer of said first elastic silicone-based material and a second layer of said second elastic silicone-based material inside said interspace, said second layer being arranged between said first layer and said outer surface of said roller supporting structure.

4. The method of claim 3 further comprising the step of providing a pair of flanges attached in a spaced apart manner to said roller supporting structure, and wherein the step of arranging said roller supporting structure inside said support mold includes arranging said pair of flanges in sealed contact with said inner surface of said support mold.

5. The method of claim 3 including rotating said roller supporting structure such that said silicone-based material distributes in a layer over said outer surface of said roller supporting structure.

6. The method of claim 5 further comprising the step of heating said layer so as to polymerize said layer.

7. The method of claim 6 further comprising the step of removing said roller supporting structure with said layer attached to said outer surface thereof from said support mold in order to obtain a roller having at least one layer of elastic silicone-based material.

8. The method of claim 3 wherein said first and second layers are made of different material types.

9. The method of claim 8 wherein said first layer is a silicone-based material layer substantially without air bubbles and said second layer is a silicone-based material foam layer which is more elastic than said first layer.

10. A method for producing a roller having at least one layer of elastic silicone-based material, comprising the steps of:

arranging a substantially cylindrical perforated hollow roller supporting structure inside a substantially cylindrical hollow support mold so as to define an interspace between an inner surface of said support mold and an outer surface of said roller supporting structure;

inserting an elastic silicone-based material inside said roller supporting structure; and rotating said roller supporting structure such that said elastic silicone-based material flows from an inside of said roller supporting structure into said interspace;

wherein said method includes performing first steps of inserting a first elastic silicone-based material inside said roller supporting structure and rotating said roller supporting structure such that said first elastic silicone-based material flows from said inside of said roller supporting structure into said interspace, and performing second steps of inserting a second elastic silicone-based material inside said roller supporting structure and rotating said roller supporting structure such that said second elastic silicone-based material flows from said inside of said roller supporting structure into said interspace, in a manner such as to form a first layer of said first elastic silicone-based material and a second layer of said second elastic silicone-based material inside said interspace, said second layer being arranged between said first layer and said outer surface of said roller supporting structure.

11. The method of claim 10 further comprising the step of providing a pair of flanges attached in a spaced apart manner to said roller supporting structure, and wherein the step of arranging said roller supporting structure inside said support mold includes arranging said pair of flanges in sealed contact with an inner surface of said support mold.

12. The method of claim 10 wherein said step of inserting said elastic silicone-based material inside said roller is performed while said roller supporting structure is rotated.

13. The method of claim 10 including rotating said roller supporting structure such that said silicone-based material distributes in a layer over said outer surface of said roller supporting structure.

14. The method of claim 13, further comprising the step of heating said layer so as to polymerize said layer.

15. The method of claim 14 further comprising the step of removing said roller supporting structure with said layer attached to said outer surface thereof from said support mold in order to obtain a roller having at least one layer of elastic silicone-based material.

16. The method of claim 10 wherein said first and second layers are made of different material types.

17. The method of claim 16 wherein said first layer is a silicone-based material layer substantially without air bubbles and said second layer is a silicone-based material foam layer which is more elastic than said first layer.

* * * * *